July 22, 1969   C. A. WENTZ, JR   3,457,322
PRODUCTION OF HIGH MOLECULAR WEIGHT OLEFINS
Filed April 22, 1964
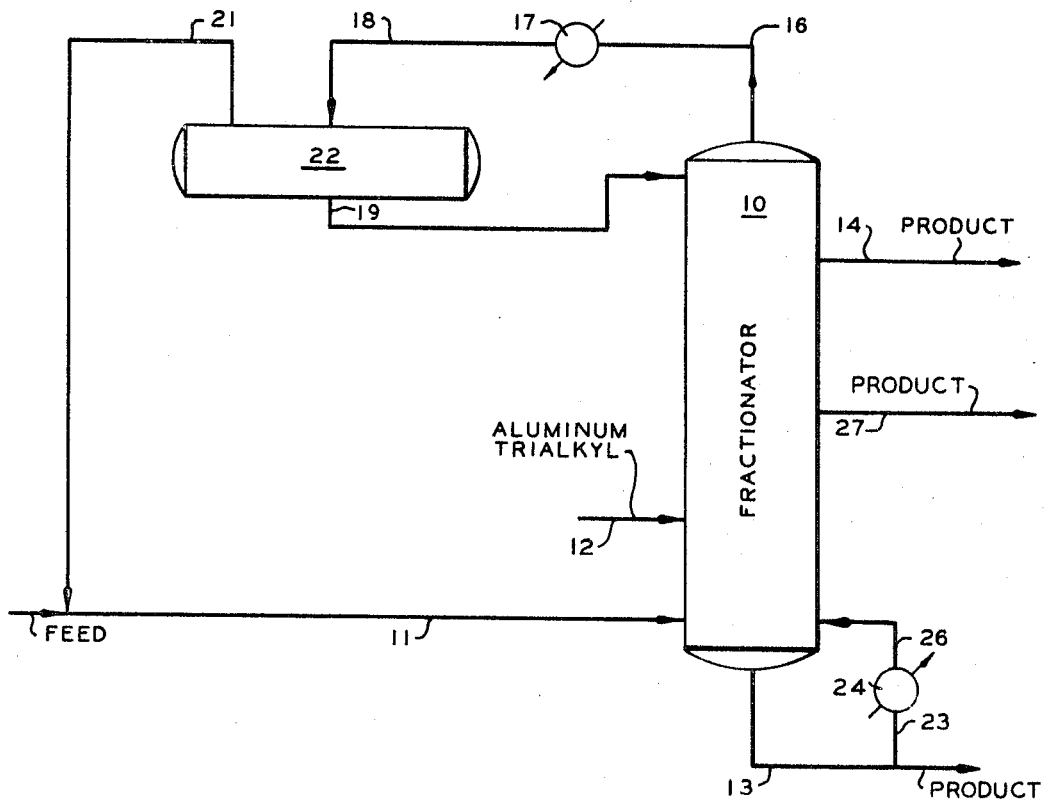
INVENTOR.
C. A. WENTZ, JR.
BY Young & Quigg
ATTORNEYS 3,457,322
Patented July 22, 1969

3,457,322
PRODUCTION OF HIGH MOLECULAR WEIGHT OLEFINS
Charles Alvin Wentz, Jr., Bartlesville, Okla., assignor to Phillips Petroleum Company, a corporation of Delaware
Filed Apr. 22, 1964, Ser. No. 361,667
Int. Cl. C07c 3/10
U.S. Cl. 260—683.15          7 Claims

ABSTRACT OF THE DISCLOSURE

A process for the production of high molecular weight olefins from a low molecular weight olefin and an aluminum trialkyl wherein the growth, displacement and product separation steps are conducted in a single fractionator maintained from 100 to 10,000 p.s.i.g., and at temperatures ranging from 350 to 600° F. in the lower portion and 125 to 325° F. in the upper portion.

---

This invention relates to the production of high molecular weight olefins from a low molecular weight olefin and an aluminum trialkyl. In another aspect, this invention relates to a process and apparatus for the production of high molecular weight olefins from a low molecular weight olefin and an aluminum trialkyl wherein the reaction and product separation steps are effected in a single fractionation zone. In yet another aspect, this invention relates to a process and apparatus for the production of high molecular weight, normal alpha-olefins from ethylene and aluminum triethyl.

Conventionally in the production of high molecular weight olefins by the polymerization of low molecular weight olefins using aluminum trialkyl activators or catalysts, the growth reaction, displacement reaction and product separation steps are conducted as independent and distinctly separate process steps. In the production of high molecular weight olefins by the polymerization of ethylene with aluminum triethyl, for example, ethylene and aluminum triethyl unite exothermically in a first or growth reaction to form higher alkyls of aluminum:

$$Al(C_2H_5)_3 + 3nC_2H_4 \rightarrow Al[(C_2H_4)_nC_2H_5]_3$$

In the above reaction, ethylene, the growth reactant, increases the number of carbon atoms in the alkyl chains of the aluminum trialkyl in multiples of two:

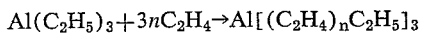

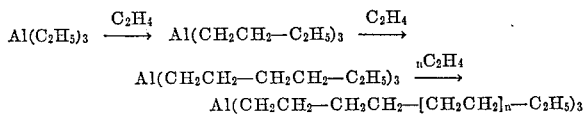

The ethylene addition to the aluminum trialkyl proceeds in a random manner such that the resulting higher molecular weight aluminum trialkyls encompass a wide molecular weight range, each of the alkyl groups generally having an even number of carbon atoms from $C_4$ to $C_{22}$ and higher.

In a second reaction, referred to as the "displacement" reaction and normally conducted in a second reaction zone, the higher molecular weight aluminum trialkyls formed by the growth reaction are split in the presence of ethylene to form normal alpha-olefins and to regenerate aluminum triethyl:

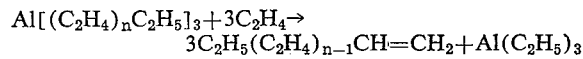

In this displacement reaction the alkyl groups grown on the aluminum by addition are displaced by ethylene. The normal alpha-olefins thus formed generally have an even number of carbon atoms per molecule and will range from $C_4$ to $C_{22}$ and higher.

The produced normal alpha-olefins are then separated from the reaction mixture in a third or product separation zone. Substantial process and equipment costs reduction would be effected were it possible to conduct the growth, displacement and product separation steps in a single process vessel.

Accordingly, an object of my invention is to provide an improved process and apparatus for the production of high molecular weight olefins from a low molecular weight olefin and an aluminum trialkyl.

Another object of my invention is to provide an improved process and apparatus for producing high molecular weight olefins from a low molecular weight olefin and an aluminum trialkyl wherein the growth, displacement and product separation steps are conducted in the same process zone.

Another object of my invention is to provide a process and apparatus for the production of normal alpha-olefins from ethylene and aluminum triethyl.

Other objects, advantages and features of my invention will be readily apparent to those skilled in the art from the following description, the drawing and the appended claims.

By my invention, I have provided a process for the production of high molecular weight olefins from a low molecular weight olefin and an aluminum trialkyl wherein the growth, displacement and product separation steps are conducted in a single process zone.

The process of this invention is applicable to the production of high molecular weight olefins from low molecular weight olefins comprising ethylene, propylene and the butenes. The employment of propene and the butenes will normally effect an increase in the produced alkyl chain in multiples of three and four, respectively. Ethylene is preferred as the higher molecular weight olefins produced from propene and the butenes are less reactive and tend to form branch chain radicals rather than the more desirably straight chain alkyl groups.

The aluminum trialkyl initiators or catalysts of my invention are those aluminum trialkyls having 2 to 22 carbon atoms per alkyl group and preferably those low molecular weight aluminum trialkyls such as aluminum triethyl, aluminum tripropyl and aluminum tributyl. Although not to be limited thereto, the preferred aluminum trialkyl is aluminum triethyl and the invention will hereinafter be described as applied to the production of high molecular weight olefins employing ethylene and aluminum triethyl.

An elongated vertical fractionation zone is employed for the growth, displacement and separation process steps of my invention. A temperature in the range of 350–600° F. is maintained in the lower region of said fractionation zone. A temperature in the range of 125–325° F. is maintained at the top of said fractionation zone. The pressure maintained within the said fractionation zone will range from 100–10,000 p.s.i.g. The ratio of aluminum trialkyl activator employed in said fractionation zone will range from 0.0001–0.015 mol of aluminum trialkyl per mol of low molecular weight olefin feed to said fractionation zone. More preferably, the ratio of aluminum trialkyl in said fractionation zone will range from 0.001–0.01 mol of aluminum trialkyl per mol of low molecular olefin feed to said fractionation zone.

By my invention, a low molecular weight olefin feed selected from the group consisting of ethylene, proylene, the buteness, and mixtures thereof is passed to the lower region of a fractionation zone containing an aluminum trialkyl, a low molecular weight olefin product fraction is withdrawn from the top of the fractionation process zone, a high molecular weight olefin product is withdrawn from the lower region of said fractionation zone, and an intermediate olefin product fraction is withdrawn from an intermediate region of said fractionation zone. A low molecular weight aluminum trialkyl is added to the fractionation zone as required to compensate for losses of the aluminum trialkyl with the high molecular weight olefin product. The rate of addition of aluminum trialkyl to the fractionation zone will normally be such as to maintain a ratio of 0.00005–0.0075 mol of aluminum trialkyl per mol of low molecular olefin feed to the fractionation zone. This is equivalent to a catalyst ratio in the total feed to the fractionation zone of about one-half that maintained in the fractionation zone. Higher and lower ratios of catalyst to olefin feeds to the fractionation zone can also be maintained. Thus, an additional advantage of the invention is that by conducting the growth, displacement, and separation steps in the same process zone and thereby recovering the catalyst for a second growth reaction, the productivity of aluminum trialkyl has been increased 100 percent by employing a feed ratio of about one-half that maintained in the fractionation zone in comparison with conventional processes. Conventionally, the aluminum trialkyl is employed on a once-through basis and is separated from the displacement reaction mixture and the product high molecular weight olefins by a process such as hydrolysis and is thus lost to the process.

The drawing is a schematic representation of one embodiment of the invention.

Referring to the drawing, the invention will hereinafter be described as applied to a specific example although it is not intended that the invention should be limited thereto. Vaporous ethylene feed at the rate of 384 mols per hour and at a pressure of 3550 p.s.i.g. is passed via conduit means 11 to fractionator 10. The ethylene feed to fractionator 10 is combined with a recycled ethylene from a source hereinafter described passed to conduit 11 via conduit means 21 at the rate of 5.1 mols per hours. Within fractionator 10, the ethylene feed is contacted with aluminum triethyl introduced into fractionator 10 via conduit means 12. 0.4 mol of the aluminum trialkyl activator is maintained within fractionator 10. In order to maintain the desired concentration of the aluminum trialkyl activator within fractionator 10, it is necessary to introduce aluminum triethyl into fractionator 10 via conduit means 12 at the rate of 0.2 mol per hour after the original charge of aluminum triethyl has been introduced into fractionator 10. It is within the scope of this invention to introduce the aluminum trialkyl activator into fractionator 10 with a diluent such as normal hexane. The diluent will be withdrawn from fractionator 10 in a product olefin stream and can be separated therefrom by conventional methods.

As previously noted, the ethylene and aluminum triethyl unite exothermically to form the higher alkyls of aluminum. The heavier reaction product moves downwardly in fractionator 10. As the reaction product moves downwardly through fractionator 10, the higher molecular weight aluminum trialkyls formed by the growth reaction are split in the presence of the ethylene feed to form normal alpha-olefins and to regenerate aluminum triethyl which flows upwardly through fractionator 10. A top temperature of 220° F., a top pressure of 3500 p.s.i.g., and a bottom temperature of 392° F. are maintained within fractionator 10.

An overhead vaporous stream is withdrawn from fractionator 10 via conduit means 16 and partially condensed by conventional heat exchange means 17. The partially condsened overhead stream is passed from heat exchange means 17 to accumulator 22 via conduit means 18. The condensed overhead fraction is withdrawn from accumulator 22 via conduit means 19 and recycled as reflux to fractionator 10. Uncondensed ethylene is withdrawn from accumulator 22 via conduit means 21 and recycled as heretofore described to conduit 11 and fractionator 10.

A product normal alpha-olefin stream comprising $C_6$ and heavier olefins is withdrawn from fractionator 10 via conduit means 13. The bottom temperature within fractionator 10 of 392° F. is maintained by recycling a portion of the product stream via conduit means 23 to a heat exchanger 24 and from heat exchanger 24 to fractionator 10 via conduit means 26. The composition of the product normal alpha-olefin stream withdrawn from fractionator 10 in mols per hour is as follows:

|  | Mols per hour |
|---|---|
| $C_6$ olefins | 17.6 |
| $C_8$ olefins | 13.5 |
| $C_{10}$ olefins | 9.8 |
| $C_{12}$ olefins | 6.5 |
| $C_{14}$ olefins | 4.7 |
| $C_{16}$ olefins | 3.0 |
| $C_{18}$ and heavier olefins | 6.8 |
| Aluminum triethyl | 0.2 |

The aluminum triethyl can be separated from the product normal alpha-olefins by conventional methods such as hydrolyzing the aluminum triethyl. A product fraction comprising $C_4$ olefins and containing a trace of $C_6$ olefins is withdrawn from fractionator 10 via conduit means 14, at the rate of 30.2 mols per hour. By withdrawing the $C_4$ olefins as formed, the formation of branched chain radicals rather than the more desirably straight chain alkyl groups is minimized. As previously noted, the presence of the less reactive $C_4$ olefins in the reaction zone tend to form branched chain radicals rather than the more desirably straight chain alkyl groups.

It is also within the scope of this invention to withdraw an additional product fraction from fractionator 10 via conduit means 27, said product fraction comprising 2.8 mols per hour of $C_6$ olefins with a trace of $C_4$ olefins. In withdrawing a product fraction from fractionator 10 via conduit means 27 in the described manner, the tendency to form branched chain radicals is further minimized.

Fractionator 10 can be a packed column, can contain trays, or can contain other conventional means for separating a mixture utilizing fractionation.

It is within the scope of this invention by the maintenance of specific controlled temperature zones and controlled pressure in fractionator 10 to obtain additional or different product streams containing desired concentrations of high molecular weight olefins.

As will be evident to those skilled in the art, various modifications of this invention can be made, or followed, in the light of the foregoing disclosure, without departing from the spirit or scope thereof.

I claim:
1. A process for converting low molecular weight olefins into higher molecular weight olefins in a single fractionator which comprises:
   (a) introducing a low molecular weight olefin selected from the group consisting of ethylene, propylene, butenes and mixtures thereof as feed into the lower region of a fractionator;
   (b) introducing an aluminum trialkyl activator into said fractionator at a first zone intermediate the region at which the feed is introduced and the top of said fractionator in an amount so that the amount of said aluminum trialkyl present in the fractionator is in the range of 0.0001 to 0.015 mol per mol of olefin feed and so that the aluminum trialkyl contacts the olefin feed;
   (c) maintaining the bottom of said fractionator in a temperature range of 350 to 600° F. and the top of said fractionator in the temperature range of 125 to 325° F., and maintaining the pressure in said fractionator in the range of 100 to 10,000 p.s.i.g.;
   the above conditions thereby initiating growth reactions within said fractionator between the aluminum trialkyl and the olefin feed to form a series of higher molecular weight alkyls of aluminum, said alkyls of aluminum subsequently moving downward in said fractionator and reacting with additional olefin feed present to produce olefin products of molecular weights greater than the feed olefins and to also regenerate the aluminum trialkyl activator;

(d) withdrawing from said first zone of the fractionator a lower molecular weight fraction of the olefin products formed;

(e) withdrawing a higher molecular weight fraction of the olefin products formed; and (f) withdrawing a vaporous stream of lower molecular weight olefins from the top of said fractionator, condensing a portion of this vaporous stream, and recycling the resultant condensate to the upper region of said fractionator as reflux.

2. The process of claim 1 wherein a portion of the higher molecular weight fraction of said olefin products withdrawn from the bottom of said fractionator is passed through a heat exchange zone and recycled to the lower region of said fractionator.

3. The process of claim 1 to include recycling at least a portion of said vaporous stream withdrawn from the top of said fractionator back to said fractionator in combination with said low molecular weight olefin feed introduced into said fractionator.

4. The process of claim 3 wherein said low molecular weight olefin feed comprises ethylene and said aluminum trialkyl introduced into said fractionator comprises aluminum triethyl.

5. The process of claim 3 wherein the mol ratio of said aluminum trialkyl introduced into said fractionator based on the low molecular weight olefin mol feed to said fractionator is substantially lower than the mol ratio of said aluminum trialkyl in said fractionator based on said molecular weight olefin mol feed to said fractionator.

6. A process of claim 1 wherein a significant fraction of said olefin products is withdrawn from a second zone of said fractionator intermediate the zone at which said lower molecular weight fraction of the olefin products is withdrawn and the region at which the feed is introduced, said fraction consisting essentially of olefin products having molecular weights in an intermediate range in relation to the lower molecular weight fraction withdrawn from the first zone of said fractionator and the higher molecular weight fraction withdrawn from the bottom of said fractionator.

7. The process of claim 6 wherein said higher molecular weigh fraction of said olefin products comprises $C_6$ and heavier normal alpha-olefins, said lower molecular weight fraction of said olefin products withdrawn from said first zone of said fractionator comprises $C_4$ olefins, and said olefin product fraction withdrawn from said second zone comprises $C_6$ olefins.

References Cited
UNITED STATES PATENTS

| | | | |
|---|---|---|---|
| 2,148,115 | 2/1939 | Gerhart et al. | 260—683.15 |
| 3,383,291 | 5/1968 | Brown et al. | 260—683.15 X |
| 3,389,161 | 6/1968 | Kottong et al. | 260—677 X |
| 2,365,426 | 12/1944 | Molique | 260—683.4 |
| 2,471,211 | 5/1949 | Hadden | 260—683.15 X |
| 3,227,773 | 1/1966 | Roming | 260—683.15 |

PAUL M. COUGHLAN, Jr., Primary Examiner

U.S. Cl. X.R.

203—29